United States Patent
Teramachi

[11] 3,808,839
[45] May 7, 1974

[54] ENDLESS SLIDING BALL SPLINE SHAFT BEARING

[76] Inventor: Hiroshi Teramachi, 8-34-2 Higashi-Tamagawa, Setagaya-ku, Tokyo, Japan

[22] Filed: Sept. 8, 1972

[21] Appl. No.: 287,219

[52] U.S. Cl. ................................ 64/23.7, 308/6 C
[51] Int. Cl. ............................................. F16d 3/06
[58] Field of Search ................ 308/6 C; 64/23, 23.7

[56] References Cited
UNITED STATES PATENTS

| | | | |
|---|---|---|---|
| 3,689,124 | 9/1972 | Irwin | 308/6 C |
| 2,891,823 | 6/1959 | Galonska | 308/6 C |
| 3,143,867 | 8/1964 | Anderson | 64/23 |
| 3,494,148 | 2/1970 | Young | 64/23 |
| 2,952,145 | 9/1960 | Thompson | 64/23.7 |

FOREIGN PATENTS OR APPLICATIONS

| 1,450,060 | 7/1969 | Germany | 308/6 C |
|---|---|---|---|

*Primary Examiner*—Manuel A. Antonakas
*Assistant Examiner*—Barry Grossman
*Attorney, Agent, or Firm*—John J. McGlew

[57] ABSTRACT

The bearing comprises a cylindrical tube, a spline shaft extending coaxially through the tube, a cylindrical ball retainer interposed between the tube and the shaft, and a plurality of balls constrained by the retainer. The inner surface of the tube is formed with axially extending first and second torque transmitting ball guide grooves having a U-shaped cross-section, the first and second grooves being arranged in alternation circumferentially of the tube and the first groove having a radial depth greater than that of the second grooves. The first grooves serve to guide non-loaded balls and the second grooves serve to guide loaded balls. At axially opposite ends, the inner surface of the tube is formed with circumferential grooves having a radial depth equal to that of the first guide grooves. The ball retainer has a uniform outer diameter and circumferentially alternating thick-wall and thin-wall portions. Each thick-wall portion is formed with a pair of angularly spaced axially extending third guide grooves, with each pair radially aligned with a respective first guide groove in the tube, and each thin-wall portion is formed with a pair of angularly spaced axially extending narrow slots having a width less than the diameter of the balls, and each pair of slots is radially aligned with a respective second guide groove in the tube. The outer surface of the retainer is formed with semi-circular ducts at its axially opposite ends each connecting a respective third guide groove to the circumferentially adjacent narrow slot. The shaft is formed with axially extending splines having a trapezoidal cross section, and each radially aligned centrally with the respective thin-wall portion of the retainer. The balls fill all of the grooves and slots.

4 Claims, 5 Drawing Figures

ENDLESS SLIDING BALL SPLINE SHAFT BEARING

BACKGROUND OF THE DISCLOSURE

In conventional endless ball bearing spline shaft bearings, the outer diameter of the bearing becomes extremely large compared with the shaft diameter necessary to transmit the power, because the torque transmitting non-loaded balls are recirculated through the outer tube or sleeve, which is uneconomical and results in a high cost.

In order to transmit large torques in both forward and reverse rotation, the shaft and tube need V-shaped ducts. Accordingly the outer diameter of the shaft necessarily increases, making fitting of the shaft into machine difficult. Naturally, there is no room for fitting a ball retainer or the like between the tube and shaft. Moreover, balls are likely to drop out when the shaft is removed for inspection or repair.

SUMMARY OF THE INVENTION

Accordingly, it is an object of the present invention to obviate the various deficiencies mentioned above.

Another object is to enable an extreme reduction of the outer diameter of the bearing compared with the diameter of the shaft, without decreasing allowable transmitting torque.

A further object is to prevent completely the dropping out of the balls even during removing the shaft.

BRIEF DESCRIPTION OF THE DRAWINGS

Other objects and many of the attendant advantages of the present invention will be readily appreciated and better understood by reference to the following detailed description when considered in connection with accompanying drawing in which like reference numerals designate like parts throughout the figures thereof and wherein.

DETAILED DESCRIPTION OF THE INVENTION

Figure 1:
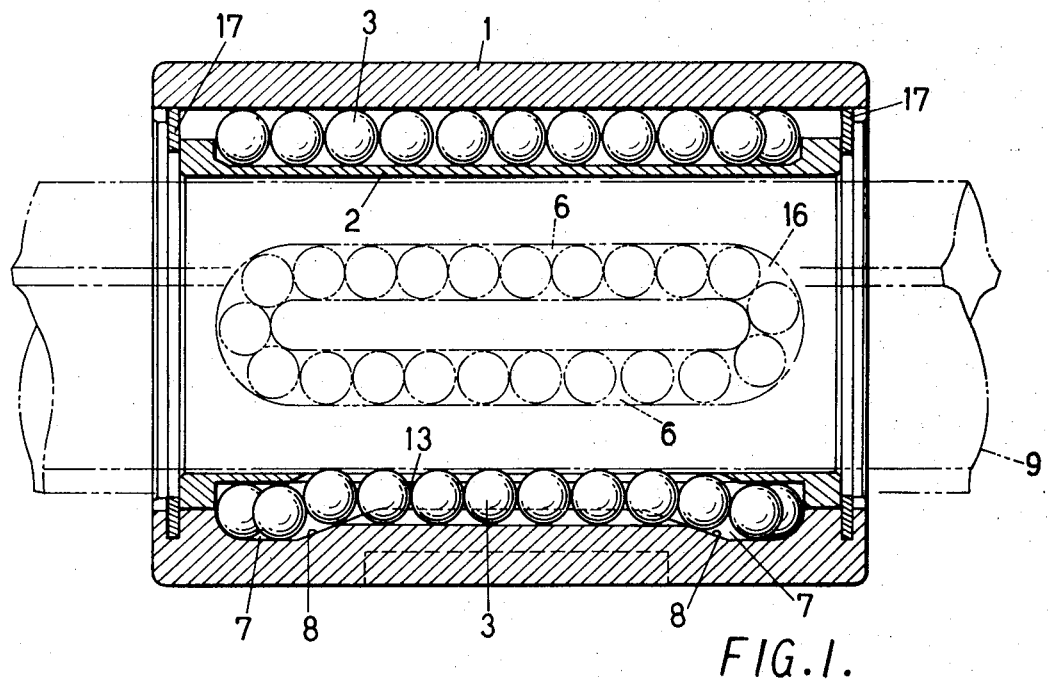
FIG. 1 is an axial sectional view of the endless sliding ball spline according to the present invention.
Figure 2:
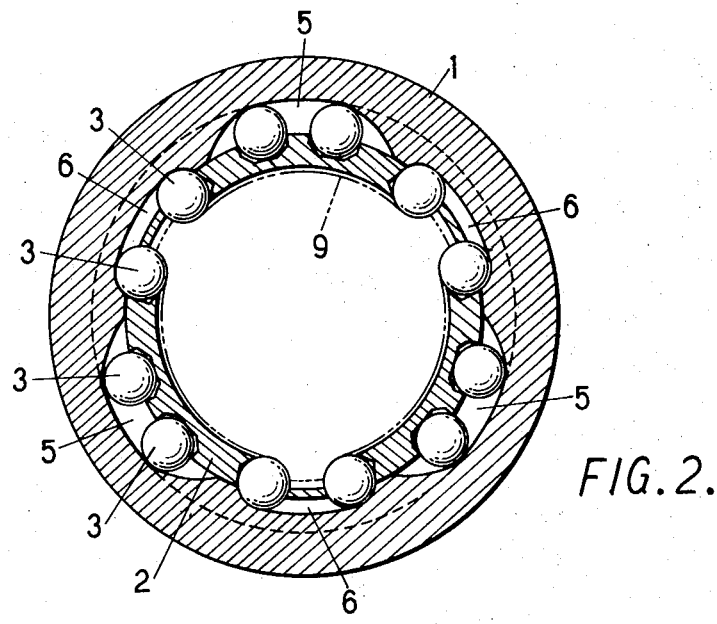
FIG. 2 is a diametric sectional view thereof.
Figure 3:
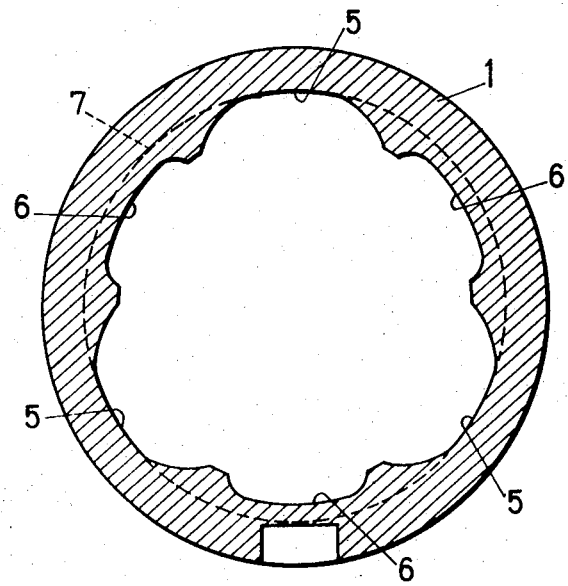
FIG. 3 is a diametric sectional view of the tube according to the present invention.
Figure 4:
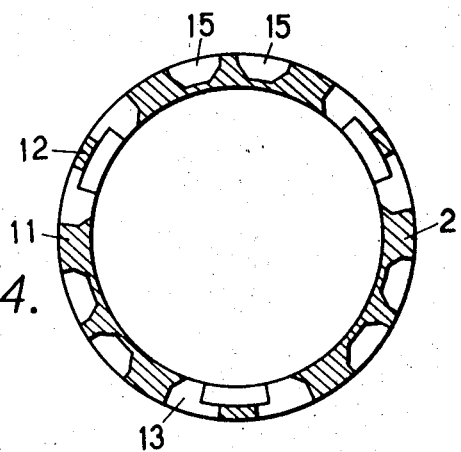
FIG. 4 is a diametric sectional view of the holder according to the present invention.
Figure 5:
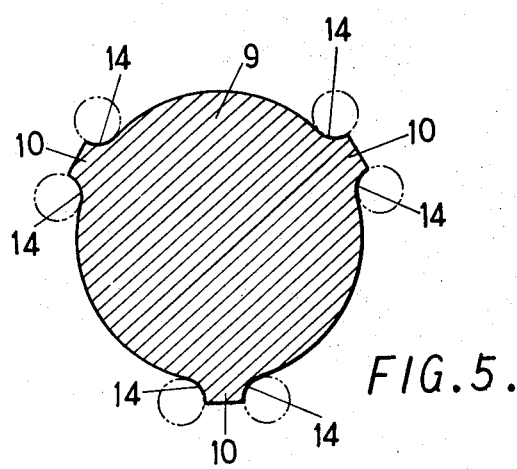
FIG. 5 is a diametric sectional view of the shaft according to the present invention.

Referring to FIGS. 1 and 2 of the drawing, the bearing includes a tube 1 which may be cut from steel pipe or otherwise formed from steel material, a ball retainer 2, bearing balls 3 and a shaft 9. The shaft 9 extends axially through the tube 1, and the bearing 2 and the balls 3 are interposed between tube 1 and shaft 9.

The inner surface of tube 1 is formed with axially extending first torque transmitting ball quide grooves 5, having a U-shaped cross-section for guiding non-loaded balls 3, and is formed with second torque transmitting ball guide grooves 6, also having a U-shaped cross-section, for guiding loaded balls 3. The grooves 5 and 6 are arranged in alternation circumferentially of tube 1, and the grooves 5 have a radial depth which is greater than that of the grooves 6. At both ends thereof, sleeve 1 is formed with respective circumferential grooves 7, having the same radial depth as grooves 5, and transitional groove portions 8 interconnect the axially extending grooves to the circumferentially extending grooves 7.

The holder of retainer 2 quides both the torque transmitting non-loaded balls and the torque transmitting loaded balls, and is in the form of a cylindrical tube having a uniform outer diameter and circumferentially alternating thick-wall portions 11 and thin-wall portions 12 which cooperate, respectively, with the non-loaded ball quide grooves 5 and the loaded ball guide grooves 6. Each thick-wall portion 11 is formed with a pair of angularly spaced axially extending guide grooves 15, with each pair being radially aligned with a respective guide groove 5 in tube 1. Each thin-wall portion 12 is formed with a pair of angularly spaced axially extending narrow slots 13 each having a width less than the diameter of the balls 3, and each pair of slots is radially aligned with respective guide groove 6 in tube 1. The outer surface of retainer 2 is formed with semi-circular ducts or grooves at its axially opposite ends, each connecting a respective guide groove 15 to the circumferentially adjacent narrow slot 13. As the slots 13 have a width slightly less than the diameter of balls 3, they prevent the balls dropping out of retainer 2 when shaft 9 is withdrawn, as for inspection, repair or replacement. The semi-circular ducts or grooves 16 provide for movement of the balls from the slots 13 to the grooves 15 and, in combination with the slots 13 and grooves 16, form a plurality of endless paths of travel in the retainer for the balls 3. Holder 2 is inserted into sleeve 1 so that the parts occupy the relative positions as shown in FIG. 2 with the balls 3 in slots 13 engaging the arcuate longitudinal edges of the groove 6 and the balls 3 in the grooves 15 bearing against the surface of the grooves 5. In FIG. 2, it will be noted that each groove 15 is adjacent a respective slot 13, the slots 13 being formed adjacent the junctures of the thin-wall portions 12 with the thick-wall portions 11.

The shaft 9 is formed with the projecting parts or splines (10) (10) (10) which are trapezoid in cross-section. The trapezoid cross-section projecting parts (10)(10)(10) extend, with the trapezoid concaved parts, between the two rows of balls 3 in the respective torque transmitting loaded ball guide grooves 6. Snap rings (17))17) retain ball retainer 2 disengageably in tube 1.

With an anti-friction spline shaft bearing, with balls circulating in endless paths, as described above, when shaft 9 moves in an axial direction through tube 1 while being rotated relative to tube 1, the torque transmitting loaded balls 3 project through slots 13 to engage the shaft. These balls 3 maintain rolling contact between the sloping faces 14 of the trapezoid cross-section splines 10 of shaft 9 and the torque transmitting loaded ball guide grooves 6. The balls roll with a contact angle in the torque transmitting direction, and shaft 9 receives the thrust or torque as fully as in an angular contact type bearing. The three parts act effectively in the direction of rotation, utilizing the full capacity of the balls 3, which is one of the characteristics of the present invention.

Torque transmitting non loaded ball guide grooves are a little deeper than torque transmitting loaded ball guide grooves. Consequently the bearing outer diameter can be extremely small in comparison with the shaft diameter. This is another characteristic.

The shaft and the spline shaft bearing can be easily fitted in the manufacturing process. The spline shaft has a high accuracy. Special labor is not needed during fitting the bearing to the machine or overhauling. These constitute advantages of the present invention.

The embodiment according to the present invention is provided with three torque transmitting non loaded ball guide grooves and three torque transmitting loaded ball guide grooves corresponding to three projections or splines on the shaft. The number is not restricted to three, but can vary between two and four in accordance with the particular requirements.

Although the loaded balls and the non loaded balls as described in the specification may superficially appear to be different, all of the balls, which completely fill the various grooves and slots, serve both as loaded balls and as non loaded balls in accordance with their particular location at any given time, the balls circulating along the endless paths of travel of the retainer 2.

While a specific embodiment of the invention has been shown and described in detail to illustrate the application of the principles of the invention, it will be understood that the invention may be embodied otherwise without departing from these principles.

What is claimed is:

1. An anti-friction spline shaft bearing, with balls circulating in endless paths, comprising, in combination, a cylindrical tube; a spline shaft extending coaxially through said tube; a cylindrical ball retainer interposed between said tube and said shaft; and a plurality of balls constrained by said retainer to follow endless paths of travel; the inner surface of said tube being formed with axially extending first and second torque transmitting ball guide grooves having a U-shaped cross-section; said first and second guide grooves being arranged in alternation circumferentially of said tube, and said first grooves having a radial depth greater than that of said second grooves; said first and second grooves guiding, respectively, non-loaded balls and loaded balls; the inner surface of said tube being formed, at axially opposite ends thereof, with circumferential grooves having a radial depth equal to that of said first guide grooves; said ball retainer having a uniform outer diameter and circumferentially alternating thick-wall and thin-wall portions, with each thick-wall portion being formed with a pair of angularly spaced axially extending third guide grooves, with each pair radially aligned with a respective first guide groove in said tube, and with each thin-wall portion being formed with a pair of angularly spaced axially extending narrow slots, having a width less than the diameter of said balls, and each pair of slots being radially sligned with a respective second guide groove in said tube; the outer surface of said retainer being formed with semi-circular ducts at its axially opposite ends each connecting a respective third guide groove to the circumferentially adjacent narrow slot; said shaft being formed with axially extending splines projecting from its outer surface and each radially aligned with a respective thin-wall portion of said retainer, each spline being substantially centered circumferentially between the two narrow slots in the respective thin-wall portion; said balls filling all of said grooves and said slots.

2. An anti-friction spline shaft bearing, as claimed in claim 1, in which said splines have a generally trapezoidal cross section with concave sloping surfaces.

3. An anti-friction spline shaft bearing, as claimed in claim 2, in which each of said first and second grooves has concave longitudinal edges; said loaded balls in each pair of slots engaging the adjacent concave longitudinal edges of the associated second groove.

4. An anti-friction spline shaft bearing, as claimed in claim 1, including snap rings seated in said tube and engaging opposite ends of said retainer to restrain said retainer against accidental displacement from said tube.

* * * * *